Patented June 26, 1934

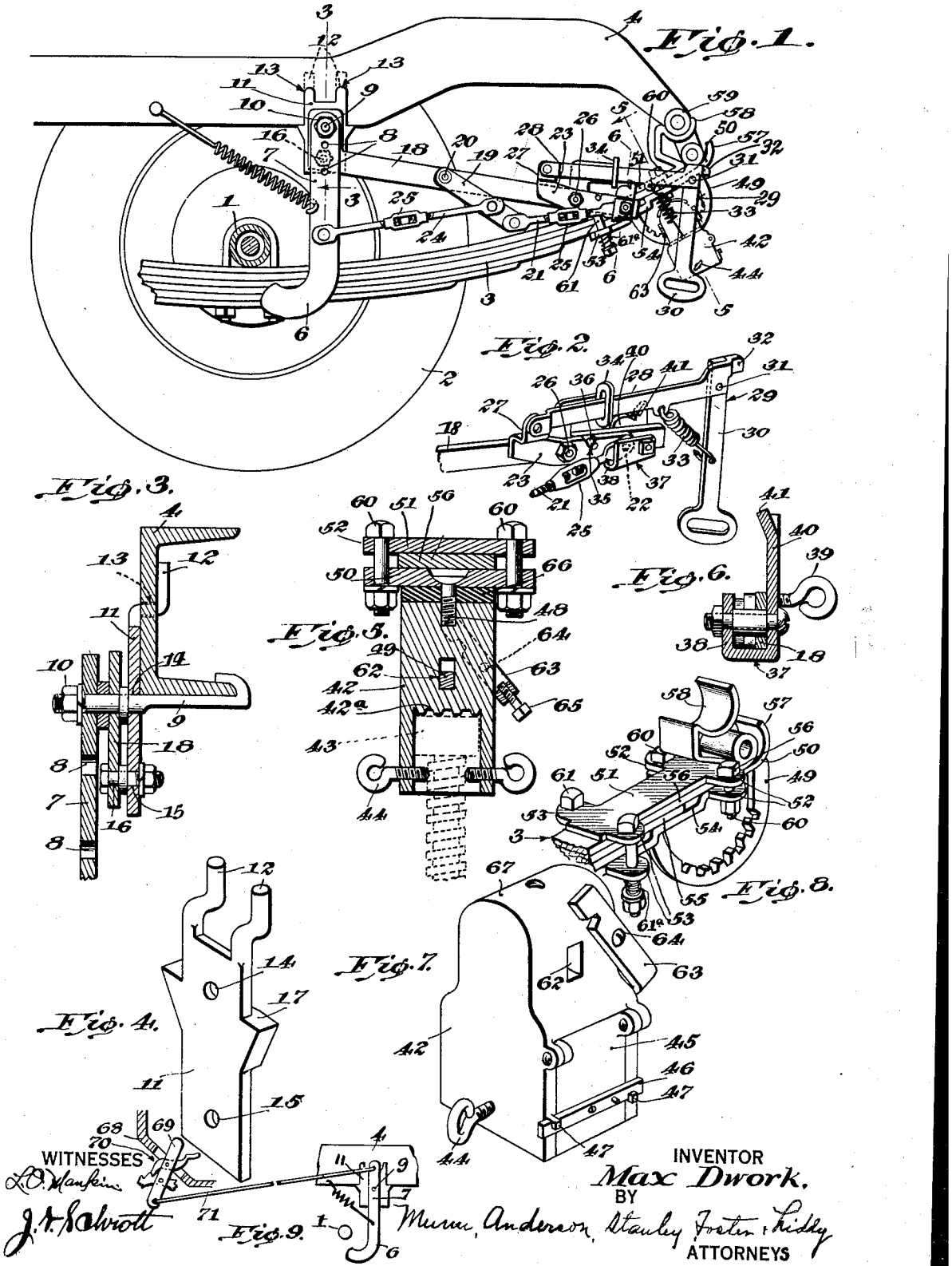

1,964,625

UNITED STATES PATENT OFFICE 1,964,625

JACKING ATTACHMENT

Max Dwork, Brooklyn, N. Y.

Application November 25, 1933, Serial No. 699,783

13 Claims. (Cl. 254—134)

This invention relates to improvements in jacking attachments in the class of land vehicles, attachments, and its object are as follows:—

First, to provide an adjustable jack socket in a location which is easily reached without having to bend and get under the automobile.

Second, to provide means for mounting the jack socket on the substantial extremity of the rear spring.

Third, to provide a stiff brace between the spring and the chassis, the brace being for the purpose of lifting the chassis when jacking power is applied to the jack socket.

In the drawing:—

Figure 1 is a cross section of the rear axle of an automobile, particularly showing the jacking attachment on the rear left side.

Figure 2 is a detail perspective view of a part of the linkage and the handle for actuating it.

Figure 3 is a cross section taken on the line 3—3 of Figure 1, particularly illustrating the improved bracket for the linkage and hook.

Figure 4 is a detail perspective view of the foregoing bracket.

Figure 5 is a cross section taken on the line 5—5 of Figure 1, particularly illustrating the adjustable jack socket.

Figure 6 is a detail cross section taken substantially on the line 6—6 of Figure 1, illustrating the improved lock for the linkage.

Figure 7 is a perspective view of the adjustable jack socket.

Figure 8 is a perspective view of the means by which the jack socket is mounted on the rear spring.

Figure 9 is a diagram showing how the hook may be operated from the front of the automobile.

The underlying purpose of the invention is to provide means for limiting the sag of the rear spring of an automobile when jacking up the chassis at a place other than beneath the axle, said place being the rear springs to which sockets are attached to receive the jack. To this end it is an improvement on Patent No. 1,928,171 for Jacking Attachment, granted to Max Dwork September 26, 1933. The jack socket and its appurtenances are claimed in the instant application while the sag-limiting means is claimed in a division of this application filed April 4, 1934 Serial No. 720,118.

Only a few parts disclosed herein are common to the patent, and those parts are the rear exle 1, right wheel 2, left rear spring 3, the portion 4 of the chassis and the hook 6. The shank 7 of the hook has a series of holes 8, a selected one of which receives the hook bolt 9. The hook is held on the bolt by a nut 10, which nut holds other parts with respect to a bracket 11. This bracket constitutes the first element of the improvement claimed in the divisional application.

It has a pair of offset pins 12 (Fig. 4), which are inserted in holes 13 in the side of the chassis 4. This arrangement enables making the connection of the bracket with the chassis without having to extend any part of the bracket over the top of the frame or chassis as in the patent. Even when all else is assembled it is still possible to apply the attachment, particularly the bracket 11, the only prerequisite being the holes 13 into which the offset pins 12 are slipped. The bracket 11 has two holes 14, 15, the first being for the hook bolt 9, the second for a securing bolt 16 (Fig. 3). The bracket also has a shoulder 17 (Fig. 4) which is engageable with the underside of the chassis to make a firm connection.

A stiff leg 18 is mounted on the bolts 9, 16. This extends rearwardly from the bracket 11, and it does not turn. It comprises a mount for all of the linkage through which the hook 6 is actuated.

That linkage comprises a bar 19, pivoted at one end to the leg at 20. The opposite end of the bar has one end of a link 21 pivoted to it, the opposite end of this link being pivoted at 22 to a member 23. One end of a second link 24 is pivoted to the bar 19 near the pivotal point of the link 21, the opposite end of the second link being pivoted to the shank 7 of the hook. The links 21, 24 are of the adjustable type. They have turnbuckles 25 for the purpose.

The member 23 is medially pivoted at 26 to the stiff leg 18. The forward end of said member has an offset 27 (Fig. 2) to which the forward portion 28 of a two-part handle 29 is pivoted. The rear portion 30 of the handle is connected with the forward portion by a pivot pin 31. A stop 32 limits the portion 30 in two directions of movement, first when the portion 30 is extended rearwardly for the purpose of actuating the linkage, second when the portion 30 is released and permitted to assume the position in Figures 1 and 2. This is accomplished by gravity, but aided by a spring 33 which serves the additional purpose of preventing rattling between the two portions.

A loop 34 (Fig. 2) receives and guides the forward portion 28, but particularly prevents the handle 29 from swinging down on its pivotal connection to the offset 27 into a position which would be hard to reach. This loop is shown as a part of the stiff leg 18, and as such it may either be riveted on or be a part of the original stamping. It is also permissible to support the loop 34 from some point other than the stiff leg, although the latter serves the purpose well.

A notch and pin 35, 36 respectively on the member 23 and stiff leg 18, interengage when the linkage and hook are in the retracted position (Fig. 1). The pin extends out far enough beyond the member 23 to obstruct the link 21 and guard against the position of the link 21 turning upwardly on its pivot 22 an undesired extent.

For the purpose of holding the linkage and hook in the retracted position (Fig. 1) the stiff leg 18 carries a lock 37. This is in the form of a U of which one side is longer than the other (Fig. 6). The short side 38 provides a pocket which fits over the rear ends of the link 21 and member 23, keeping the pivot 22 from swinging downwardly, which would be necessary for the movement of the linkage and the hook to the axle-engaging position.

A set screw 39 (Fig. 6), carried by the long side 40 is turned until it binds against the leg 18, thereby to hold the lock 37 in the position in Figures 1 and 2. The long side 40 is provided with a lug 41 for the purpose of preventing the lock from turning down too far when the set screw is released. The tendency of the lock is to turn counter-clockwise when the set screw is released, and at such a time the lug 41 will engage the top of the stiff leg.

A jack socket 42 which is the invention claimed herein is mounted on the substantial extremity of the spring 3 so as to be easily accessible to any ordinary type of jack. The head 43 of an ordinary screw jack is shown in place in the socket in Figure 5, there being a roughened place 42ª to prevent slipping of the head. The socket is equipped with one or more set screws 44 for the purpose of binding against the jack screw and securing the two together temporarily. One side of the socket is equipped with a hinged gate 45 (Fig. 7) which is intended to be raised to enable the insertion of the head 43 in an instance wherein the chassis is so close to the ground as to make it difficult to emplace the jack. A pivoted lock bar 46 and lock members 47 keep the gate 45 normally closed.

Means for mounting the jack socket at the substantial extremity of the rear spring comprise a center bolt 48 (Fig. 5), or its equivalent, a circular rack 49 (Fig. 8), a rack plate 50 and a clamp plate 51. The two plates have confronting pairs of ears 52, 53. The rack 49 is fixed to the rack plate 50 on the underside, and the teeth of the rack are on the inside of the circle. The rack plate has at least one step 54 providing a space for the free action of the leaves 55 other than the main leaf 56 of the spring. A curvature 57 provides a rear guard for the purpose of preventing the mounting means (Fig. 8) from slipping forwardly on the spring 3 too far.

The clamp plate 51 has a saddle 58 which fits under the knuckle 59 (Fig. 1) of the chassis 4 for the purpose of transmitting the lifting power of the jack, applied at the socket 42, to the chassis when desiring to raise the chassis. The saddle constitutes a stiff brace between the spring and the chassis. The foregoing fit is sufficiently loose to avoid interference with the normal spring shackle action.

Bolts 60, 61 go through the ears 52, 53 (Fig. 8) to connect the two plates 50, 51. The nuts of the bolts 60 are applied very tightly so as to clamp the two plates to the main leaf 56. The nuts of the bolts 61 are applied relatively loosely so as not to clamp the forward end of the rack plate 50 so hard against the leaves 55 as to interfere with their normal sliding action. A spring 61ª between the ears 53 and a washer on each bolt 61 prevents rattling.

The center bolt 48 (Fig. 5) provides a pivot on which the jack socket 42 is capable of swinging. The pivotal point is the center of the rack 49. The socket has a slot 62 in which the rack works. A detent 63, in the form of a yoke which is pivoted to the socket at 64, is engageable with the tooth spaces of the rack for the purpose of holding the jack socket in its adjusted positions. When the detent is so engaged, the set screw 65, carried by the detent is driven against the side of the jack socket so as to hold the detent in its locking position. A pad 66 of rubber or other suitable material is inserted between the rounded top 67 of the jack socket and the underside of the rack plate 50 for the purpose of easing the swinging motion of the socket and preventing any noise due to rattling.

Figure 9 illustrates an arrangement by which the hook 6 can be operated from the front of the automobile, for example from the toe-board 68. A lever 69, or its equivalent, has a rack and dog arrangement commonly designated 70 for holding the lever and its connecting link 71 against the tension of the spring which normally tends to pull the hook toward the axle 1. Upon release of the dog the spring pulls the hook forwardly into the position to be engaged by the axle when the spring sags as brought out above.

The operation is readily understood. In viewing Figure 1 it is to be borne in mind that the left rear wheel is the one omitted, and that the jacking attachment shown in detail there is the mechanism to be brought into play for the purpose of raising the left wheel from the ground when the jack is applied. The two jacking attachments at the rear are identical.

The operator reaches under, backs off the set screw 39 (Fig. 6) of the lock 37 and swings the lock rearwardly clear of the pivot 22. The spring which is connected between the shank 7 and the chassis 4 then pulls forwardly on the shank until the hook 6 comes beneath the axle 1, at the same time turning the linkage in a generally clockwise direction and thrusting the handle 29 rearwardly into a position whereat it will not be necessary to reach between the mud guard and frame to get a hold on the actuating handle bar.

The head 43 of the jack is now inserted in the socket 42. The socket is first adjusted to the most convenient position with respect to the circular rack 49. Usually the adjustment will be straight up and down. The jack is now worked. The force of the jack is applied to the spring 3 at its rear extremity and the lifting force is transmitted to the knuckle 59 of the chassis 4 through the saddle 58. The spring 3 will begin to sag due to the weight of the wheel and axle, but the axle will soon be caught by the hook 6 so as to limit the sag.

Upon operating the jack on a reverse order the chassis will be let down again. The operator now reaches down to take hold of the rear portion 30. The handle 29 is straightened by pulling up on said portion until its top edge engages the stop 32. This makes the handle rigid as far as a direct forward push is concerned, and upon so pushing on the handle the linkage is turned counter-clockwise, swinging the shank 7 rearwardly and causing the hook 6 to substantially clear the axle 1. The lock 37 is then re-engaged with the linkage at the pivot 22 and secured by the set screw 39. Upon release of the portion 30 the spring 33 will draw the latter down until its erstwhile forward end engages the stop 32.

It is to be observed that the linkage, namely the linkage for swinging the hook shank 7 in one direction, is all mounted on the stiff leg 18. This leaves the rear spring free for other purposes, in which respect the instant invention differs from the patent. The jack socket is now carried by the spring, and the arrangement illustrated makes it possible to impart the direct upward force of the jack to the chassis through the medium of the spring without reversely flexing the spring or the possibility of injuring it otherwise.

I claim:—

1. A jacking attachment comprising socket means to which a lifting force is to be applied, mounting means by which the socket means is attached to the substantial extremity of a rear spring of a vehicle, means by which the lifting force is transferred from the mounting means to the chassis, and means positioned under the axle to catch the axle and limit the resulting sag of the spring.

2. A jacking attachment comprising socket means to which a lifting force is to be applied, mounting means by which the socket means is attached to the substantial rear extremity of the spring of a vehicle and means by which the mounting means is rigidly secured to the main leaf of said spring, a brace between the mounting means and chassis to impart the lifting force to the chassis, and means positioned under the axle to catch the axle and limit the resulting sag of the spring.

3. A jacking attachment comprising a socket to receive the head of a jack, mounting means by which the jack is attached to the spring of a vehicle, said mounting means including a movable support and an adjustment for the socket on its movable support, a stiff brace included in the mounting means to transfer the lifting force of the jack to the chassis, and means to go under the axle to catch the axle and limit the resulting sag of the spring.

4. A jacking attachment comprising a socket to receive the head of a jack, mounting means by which the socket is attached to the spring of a vehicle, and means to transfer the lifting force of the jack from the mounting means and spring to the chassis.

5. A jacking attachment comprising means to receive the lifting force of a lifting implement, mounting means attaching said means to the flexible spring of a vehicle, and a rigid brace between the mounting means and chassis to transfer the lifting force to the chassis and preventing undue flexure of the spring during lifting.

6. A jacking attachment comprising a jack socket, a pair of plates and means by which said plates are clamped to a vehicle spring, means movably attaching the socket to one of the plates, and means by which the socket is adjustable with respect to said plate, and a brace on the other plate having a saddle fitting under the knuckle of the chassis.

7. A jacking attachment comprising a jack socket, a pair of plates and means to clamp them onto a vehicle spring, a pivot bolt movably connecting the socket to one of the plates and means for adjusting the socket on the pivot bolt with respect to said plate, and a stiff brace carried by the other plate having a saddle to fit against a part of the chassis.

8. A jacking attachment comprising a jack socket, a pair of plates and means to fixedly clamp them to the main leaf of a vehicle spring, a pivot bolt movably connecting the socket to one of the plates, and means for adjusting the socket on said bolt with respect to said plate, and a rigid brace carried by the other plate having a saddle to engage a part of the chassis.

9. A jacking attachment comprising a jack socket and mounting means by which it is attached to the spring of a vehicle, said mounting means comprising a pair of plates respectively situated above and below the spring, means to fixedly clamp the plates to the main leaf of the spring, the lower plate having at least one step to make room for another leaf in its sliding motion, and a brace carried by the upper plate having a saddle to engage a part of the chassis.

10. In a jacking attachment, a jack socket, mounting means by which the socket is attached to the spring of a vehicle, and means included in the mounting means to limit its slipping down on the spring in the event of loosening.

11. In a jacking attachment, a jack socket having a rounded top, mounting means attaching the socket to the spring of a vehicle, means turnably connecting the socket at its rounded top to the mounting means, a circular rack carried by the mounting means with respect to which the socket is turnable, and a detent carried by the socket to engage the rack and hold the socket in its adjustment.

12. In a jacking attachment, a jack socket having a rounded top, mounting means attaching the socket to the spring of a vehicle, means turnably connecting the socket at its rounded top to the mounting means, a circular rack carried by the mounting means with respect to which the socket is turnable, a detent carried by the socket to engage the rack and hold the socket in its adjustment, and means to lock the detent in its engaging positions.

13. In a jacking attachment, a jack socket having an open side, a hinged gate for said side, and locking means to normally keep the gate closed.

MAX DWORK.